Figure 3:
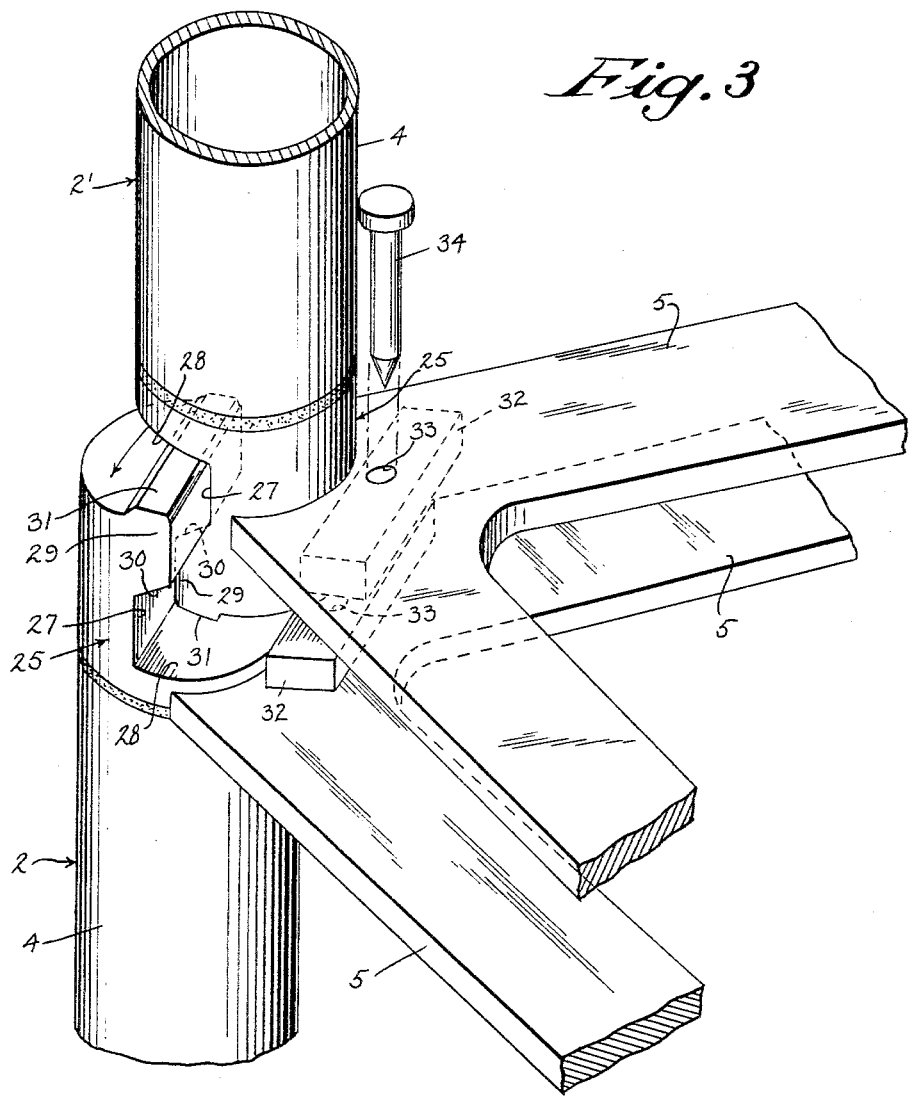

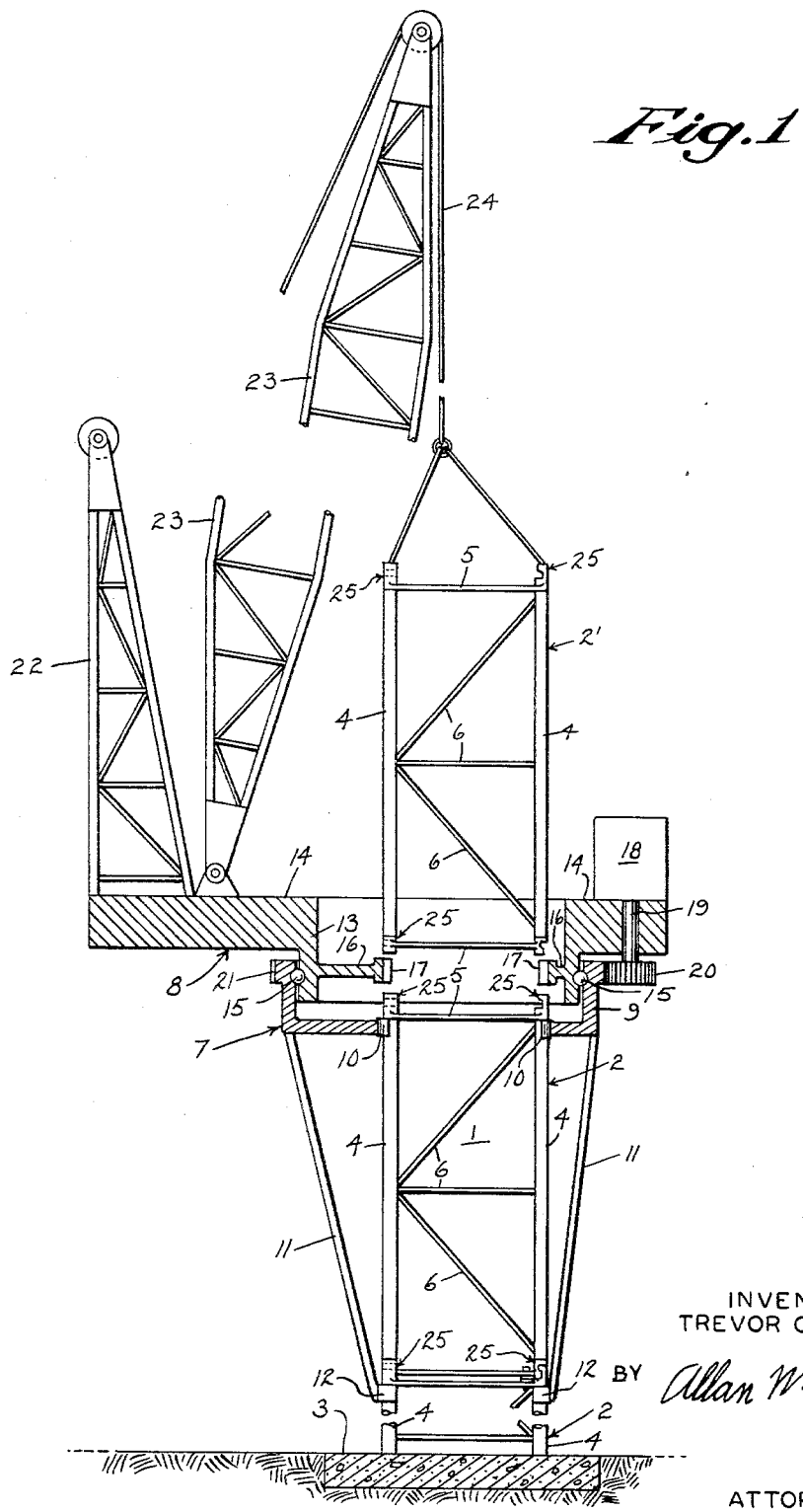

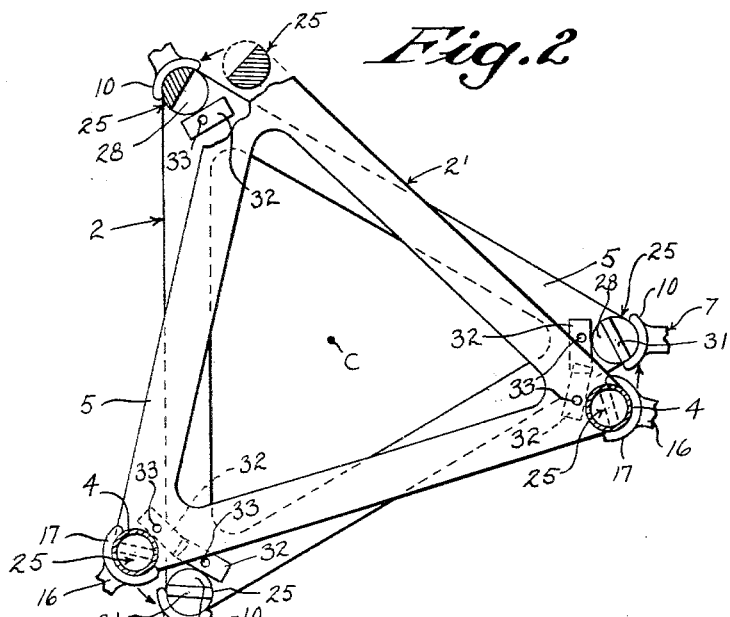
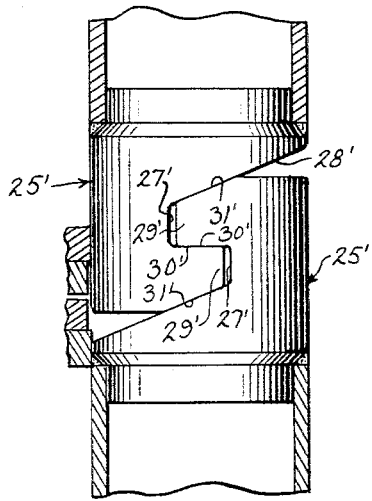
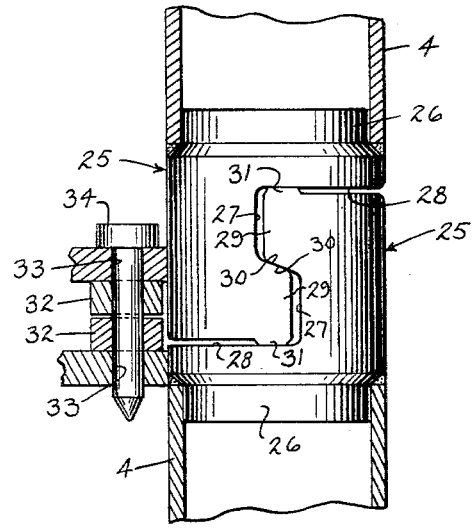
INVENTOR
TREVOR O. DAVIDSON

May 10, 1966

T. O. DAVIDSON 3,250,401

SELF-ERECTING TOWER CRANE WITH BAYONET
JOINTS BETWEEN SECTIONS

Filed Dec. 17, 1964

3 Sheets-Sheet 3

INVENTOR
TREVOR O. DAVIDSON

BY *Allan W. Leiser*

ATTORNEY

United States Patent Office 3,250,401
Patented May 10, 1966

3,250,401
SELF-ERECTING TOWER CRANE WITH BAYONET JOINTS BETWEEN SECTIONS
Trevor O. Davidson, Milwaukee, Wis., assignor to Bucyrus-Erie Company, South Milwaukee, Wis., a corporation of Delaware
Filed Dec. 17, 1964, Ser. No. 419,111
11 Claims. (Cl. 212—64)

This invention relates to tower cranes; and particularly to those of the self-erecting type which include a sectional tower and a revolvable frame which is revolvable about and movable along the tower. Additional tower sections are added from above through the frame and the frame is then moved upwardly to the top of the newly added sections. The invention resides more particularly in an improved crane of this general type in which the tower sections have twist connections with one another and there are jaw means on the revolving frame engageable with the tower so that the sections can be connected and disconnected using the frame as a wrench.

A self-erecting tower crane of the general type contemplated herein is shown in U.S. Patent No. 3,053,398 to Liebherr et al., issued September 11, 1962. In the Liebherr construction, however, the tower sections must be bolted or similarly connected to one another and this presents several disadvantages. First, it is difficult and dangerous to connect and disconnect the sections by bolting. Also, the bolted connections may become loose with obvious dangers. Further, the alignment of the tower sections during erection is critical in the case of bolted connections, thus making the tower even more difficult to assemble. Still further, the weight of the boom and frame on the tower may cause bolted connections to freeze so that it could be extremely difficult to disassemble the tower.

It is the general object of this invention to provide an improved self-erecting tower crane in which the tower sections have twist connections with one another and the revolving frame has jaw means to engage the tower so that it can be used as an extremely powerful wrench to connect and disconnect the tower sections.

It is another object of this invention to provide simple but extremely effective twist connections between the tower sections, comprising interlocking bayonet-type connectors at the ends of the legs of the tower sections. In the preferred embodiment of the invention shown herein, two interlocked connectors have mating surfaces which are sloped or inclined to provide a wedging action insuring a secure connection and mating surfaces which are cut away to concentrate the vertical load at the center of the tower section legs. Further, the connections are set at obtuse angles to the tower to allow for the twist connections to be made without binding while keeping the horizontal thrust due to wedging as nearly radial as possible.

It is a further object of the invention to provide support means to support the tower sections as they are being connected and disconnected, which means are effectively disengaged after connection has been made.

It is still another object of this invention to provide simple, positive lock means to hold the tower sections in connected relationship.

It is a still further object of this invention to provide a construction in which the jaw means on the revolving frame guides and acts on the tower sections to effect connection and disconnection, but is completely disengaged from the tower while the crane is working.

It is still another object of this invention to provide a construction in which the tower sections are three-legged to minimize misalignment problems.

Other objects and advantages will appear from the description to follow. In the description reference is made to the accompanying drawings, forming a part hereof, in which there is shown by way of illustration and not of limitation a preferred embodiment of the invention. For the purposes of clarity and simplicity, certain elements which would be included in a tower crane but are not essential to this invention have not been shown in the drawings, and others are shown schematically. The omitted and schematically shown elements will, however, be readily understood by those skilled in the art to which this invention pertains.

In the drawings:

FIG. 1 is a side elevational view, partially broken away and in cross-section, of a tower crane formed according to the invention, FIG. 2 is an enlarged, fragmentary top view illustrating two tower sections immediately prior to their being connected, FIG. 3 is an enlarged fragmentary view in perspective illustrating the bayonet type connectors, support means and lock means, FIG. 4 is an enlarged fragmentary view, partially in cross-section, illustrating two connectors in interlocked relation as well as the lock and support means, and FIG. 5 is an enlarged fragmentary view, partially in cross-section, similar to FIG. 4 but illustrating a modified form of connector.

The crane of FIG. 1 comprises a tower 1 made up of a plurality of connected tower sections 2. There is also shown in FIGS. 1 through 3 another tower section, designated 2', but substantially identical to the other sections 2 in various stages of being connected to the tower 1 as will be described. The lowermost or bottom section 2 rests on a concrete footing 3 set in the ground. Although tower cranes of the type contemplated herein are often set upon such footings, it will be appreciated that a crane formed according to the invention could be supported on a building floor or on a crawler or other vehicle.

The several tower sections 2, including the section 2', are substantially identical, all having three vertical legs 4 arranged to give the sections 2 an equilateral triangular cross-section. Near the ends of each tower section 2 are web-like braces 5 which extend between the legs 4 and are welded or otherwise securely affixed thereto. The braces 5 of each section 2 face those of adjacent sections 2. Suitable additional braces 6 are provided to give the sections 2 sufficient rigidity and strength.

The working frame assembly of the crane includes a supporting structure designated generally by the reference numeral 7 and a revolving frame portion designated generally by the reference numeral 8. The supporting structure 7 comprises a ring-like base 9 which encircles the tower 1 and is slidably mounted thereon by means of three channel-shaped shoes 10 which are located so as to slidably receive associated legs 4. Further support for the base 9 is provided by three struts 11 which extends downwardly from the base 9 and are provided at their lower ends with shoes 12, similar to shoes 10, which also slidably receive the legs 4. Suitable braces (not shown) may be supplied between the struts 11. Latch means (not shown but which can be supplied by one skilled in the art) are provided to operate in conjunction with the shoes 10 and 12 to hold the base 9 in selected vertical positions on the tower 1.

The revolving frame 8 includes a central ring-like portion 13 which also encircles the tower 1 and is concentric with and extends into the base 9, and an outwardly extending working platform portion 14. A circular bearing 15 of any suitable type mounts the frame 8 so that it may be revolved within the base 9 and about the tower 1. Extending into the central opening of the frame portion 13 are three arms 16 provided at their inner ends with inwardly opening, generally channel-shaped shoes 17 so spaced as to be adapted to slidably receive the legs 4 of the tower section 2'.

On the right-hand side of the platform 14 as seen in FIG. 1 is a swing power unit 18 which may be of any suitable design and has its output shaft 19 extending downwardly through the platform 14. A swing pinion 20 is mounted on the shaft 19 and engages a swing gear 21 formed on the base 9. The power unit 18 is, therefore, capable of causing the frame 8 to revolve about the tower 1.

On the left-hand side of the platform 14 as seen in FIG. 1 are an A-frame 22 and a working boom 23. A suitable power unit, winches, cables and the like will of course be provided, but these elements are not shown in FIG. 1 for the sake of simplicity and since they play no part in this invention and are well-known in the art. There is shown in FIG. 1 only a primary or hoisting cable 24 which is trained about the end of the boom 23.

The twist connections between the tower sections 2 are effected by means of bayonet-type connectors 25 provided at both ends of each leg 4 of each tower section 2. As can be seen in FIG. 4, the legs 4 are tubular with open ends and the connectors 25 have reduced inner end portions 26 which are received therein, the connectors 25 being securely fixed in place by welding or other suitable means.

All of the connectors 25 are identical in the preferred embodiment shown herein, and the downwardly facing connectors 25 of any tower section 2 are arranged to interlock with the upwardly facing connectors 25 of a section 2 that is below to provide a twist connection between the two sections 2.

Referring particularly to FIGS. 3 and 4, each connector 25 is cut away to form a bayonet slot 27 which has a floor 28 that extends to the front of the connector 25, the "front" being the left side with respect to the lower connector 25 shown in FIG. 4. The slot 27 runs substantially straight across the connector 25 from side to side and extends somewhat to the rear, to the right with respect to the lower connector 25 of FIG. 4, of the midline of the connector 25, which is also the midline of the leg 4.

Above and overhanging the slot 27 is a bayonet projection 29 which also runs substantially straight across the connector 25 and extends forwardly from the rear of the slot 27 to a point somewhat formed of the midline. The surface 30 serves as the roof of the slot 27 and the undersurface of the projection 29 and is inclined upwardly from the rear to the front of the connector 25. The upper surface of the projection 29 extends all the way to the rear of the connector 25 but is cut away to the rear of the midline to define an upstanding projection 31 that extends across the connector 25 and is generally parallel to and directly above the surface 30, both being at or straddling the midline of the connector 25.

The manner in which two connectors 25 interlock is illustrated by FIG. 4. When two connectors 25, one facing downwardly and the other upwardly, are brought into interlocking relationship, the bayonet projection 29 of one is received in the bayonet slot 27 of the other with the inclined surfaces 30 mating. The upper surface of the bayonet 29 of each connector 25 faces the floor 28 of the other, but actual engagement is had only between the projections 31 and floors 28.

As the two connectors 25 are moved against one another into interlocking relationship, the inclined surfaces 30 provide a wedging action. The slope of the surfaces 30 is such that there is a clearance between the front faces of the bayonets 29 and the rear walls of the slots 27 even after the two connectors 25 are fully interlocked. Thus, there are only three areas of engagement for two interlocked connectors 25—at the facing surfaces 30 and at the two areas where the projections 31 engage the floors 28. All three areas of engagement are generally rectangular and run across the connectors 25 at their midlines, so that vertical load is in effect concentrated at the centerlines of the legs 4.

The desirable wedging action and load concentration can be provided in other ways within the purview of the invention, as illustrated by the modified connectors 25' shown in FIG. 5. The connectors 25' have bayonet slots 27' and bayonet projections 29' similar to those of the connectors 25. The floors 28' are, however, inclined downwardly from rear to front and the facing surfaces 30' are flat. The upper surfaces of the bayonets 29' have inclined portions 31' at the midlines of the connectors 25' which face and mate with the floors 28' and are flat behind the surfaces 31'. Thus, wedging is provided by the surfaces 28' and 31' and the load is concentrated at the midlines of the connectors 25'.

Other variations are also possible. For example, the bayonet slots 27 could be tapered or inclined from side to side to be of less height at one side of the connector 25 than at the other. Thus, where an inclined surface is referred to generally in the appended claims it is intended to cover any incline, from front to back, side to side, etc., which provides a wedging action between two connectors.

FIGS. 1 through 3 illustrate the manner in which the new tower section 2' is connected to the uppermost section 2 of the tower 1. In essence, the new section 2' is brought into position and rotated so that its connectors 25 interlock with the connectors 25 of the uppermost section 2. From FIG. 2 it can be seen that the connectors 25 are set at obtuse angles with respect to a radius drawn from the center C of the tower 1. That is, considering the three connectors 25 as being in a circle drawn about the vertical centerline of a section 2, the slots 27 and projections 29 and 31 of each connector 25, which are all generally parallel to one another, are not tangent to the circle but are at angles of approximately 110° to a radius drawn to the center of the connector 25. It would actually be desirable from one standpoint to have the connectors 25 tangent or perpendicular to radii from the center of the tower 1 since the horizontal thrust due to the wedging action would then act radially outwardly and there would be no tendency for the sections 2 to rotate toward a release or disconnection. Having the connectors 25 tangent, however, would prevent twisting new sections 2 into place unless the bayonets 29 and/or the slots 27 were curved to conform to the circle formed by the legs 4. Having the connectors 25 set radially would also be advantageous in that it would allow for complete symmetry so that any section 2 could be reversed end for end. There would, however, be a distinct tendency for the sections 2 to release or "unwind" if radial connectors 25 were used. Having the connectors 25 at obtuse angles of approximately 110°, a compromise position, provides ease of connection with straight bayonets and slots and a secure connection while keeping horizontal thrust as nearly radial as possible.

The outer surfaces of the braces 5 are each provided with a set of three block-like support members 32, one directly in front of each connector 25, the members 32 of one section 2 thus directly facing those of adjacent sections 2 when the sections 2 are connected. The members 32 extend far enough to the sides of their connectors 25 so that when a new section such as the section 2' is to be connected its members 32 can engage and rest on the members 32 of the uppermost existing section 2 so that the section 2' is supported during connection at the desired vertical level. This initial supporting engagement is illustrated by FIG. 2.

Although support for the new section 2' is desirable during connection, there should be no engagement between the members 32 when the section 2' is in place since the load should be concentrated at the midlines of the legs 4. Accordingly, the members 32 are slightly inclined. In FIG. 3, the lower member 32 inclines downwardly from the rear to the front of the view while the upper member 32 inclines upwardly from front to rear. The incline is such that the connectors 25 of the sections 2 and 2' are supported by the members 32 at the same vertical level at the beginning of an interconnecting movement when the connectors 25 first mesh. As the section 2' is further rotated, it is supported by the engagement of its connectors 25 with those of the section 2 and by the time connection has been completed the members 32 are spaced as seen in FIG. 4. Although the preferred embodiment shown herein utilizes members 32 on both ends of each section 2, it would be possible to provide single, thicker members on only either the upper or lower ends of the sections 2 so long as there is a resulting supporting engagement. Such a single member would then directly engage the brace 5 of an adjacent section 2.

The necessity of having the members 32 inclined may be avoided with the embodiment of FIG. 5 since the inclined floors 28' and surfaces 31' cause the sections 2 to be spread apart as a connection is made.

Openings 33 are provided radially inwardly of each connector 25, and extend through the members 32, the openings 33 of two facing braces 5 being in alignment when the sections 2 are connected. A headed pin 34 is then passed through each pair of openings 33, the pins 34 serving as simple, positive means to lock the sections 2 and 2' in connected relationship.

In FIG. 1, the working frame assembly, comprising the support structure 7 and the revolving frame 8, is mounted and latched on the top two sections 2 in what can be termed a "working" position. In this position, the shoes 17 are above the last or uppermost section 2 and the frame 8 is free to rotate so that the crane can work. When the new section 2' is added it is lifted, using the cable 24, to the position illustrated in FIG. 1. From this position, the new section 2' is lowered until the shoes 17 slidably receive its legs 4. The frame 8 is then revolved to move the new section 2' to the position of FIG. 2, from which the new section 2' is lowered until it is supported by the engagement of its members 32 with the members 32 of the lower section 2. The frame 8 is then revolved in a counterclockwise direction, as seen in FIG. 2, to twist the new section 2' through the position of FIG. 3 until its lower connectors 25 are interlocked with the upper connectors 25 of the previous section 2, the shoes 17 serving as jaw means engaging the new section 2' during connection. The pins 34 are then used to lock the new section 2' in place. The three-legged construction of the sections minimizes misalignment problems during connection.

After the new section 2' is locked in place, any suitable means (not shown), such as an auxiliary pulley system for the cable 24, can be used to lift the frame assembly to the top of the new section 2' where it is again latched in place. The crane can then resume working, or another section 2 can be added. Disassembly is of course accomplished by reversing the various steps.

The shoes 17 serve as one particularly satisfactory type of jaw means to engage the tower 1 which enables the revolving frame 8 to be used as an extremely powerful wrench for assembly and disassembly of the tower. They should be deep enough so that the legs 4 are engaged from both sides to allow both connection and disconnection. The channel shape of the shoes 17 allows for connecting and disconnecting engagement, but also allows a new section 2' to slide vertically thus allowing for the slight lowering which occurs because of the sloped members 32.

Although a preferred embodiment of the invention has been shown and described herein, it should be obvious that changes could be made without departure from the invention. For example, although the bayonet-type connectors 25 shown herein are particularly satisfactory, other types of twist connections for the sections 2 could be provided while maintaining the basic advantage of being able to connect without bolting and using the frame 8 as a wrench. The term "twist connection" in the appended claims is, therefore, intended to cover any appropriate form of connection. The invention is not intended to be limited in this or any other respect except insofar as limitations specifically appear in the appended claims.

I. claim:

1. In a tower crane the combination comprising: a tower formed of a plurality of sections; twist connections between the tower sections; a revolvable frame that is movable along and revolvable about the tower; and jaw means mounted on and revolvable with the frame and adapted to engage the tower to enable the frame to be used as a wrench to connect and disconnect the tower sections.

2. In a tower crane the combination comprising: a tower formed of a plurailty of tower sections having vertical legs; twist connections between the tower sections; a revolvable frame movable along and revolvable about the tower; and jaw means mounted on the frame and adapted to slidably receive the legs of a succeeding tower section to be added to the top of the tower and to engage the legs to twist the succeeding section in response to revolution of the frame.

3. In a tower crane the combination comprising: a tower formed of a plurality of tower sections having vertical legs; twist connections between the tower sections; a frame supporting structure mounted on and movable along the tower and adapted to be latched in a working position near the top of the tower; a revolvable frame encircling the tower and revolvably mounted by and movable with the supporting structure; and jaw means mounted on the revolvable frame which are above the top of the tower when the supporting structure is in working position and are adapted to slidably receive the legs of a succeeding tower section to be added to the top of the tower and to engage the legs to twist the succeeding section in response to revolution of the frame.

4. In a tower crane the combination comprising: a tower formed of a plurality of tower sections in aligned end-to-end relationship; at least three spaced bayonet-type connectors at each end of each tower section, the connectors of each section being aligned and interlocked with those of the adjacent sections to provide releasable twist connections between the tower sections; a revolvable frame movable along and revolvable about the tower; and jaw means mounted on and revolvable with the frame, said jaw means being adapted to twistingly engage the tower.

5. In a tower crane the combination comprising: a tower formed of a plurality of tower sections each having at least three vertical legs, with the legs of the sections being in aligned end-to-end relationship; bayonet-type connectors at the ends of the tower section legs to provide twist connections between the tower sections in which facing connectors of two sections are interlocked; a revolvable frame movable along and revolvable about the tower; and a plurality of jaw means mounted on and revolvable with the frame, there being one jaw means for each leg, each jaw means being channel shaped and opening inwardly to be adapted to slidably receive the legs of an additional section to be added to the tower and to twist the additional section in response to revolution of the frame.

6. In a tower crane the combination comprising: a pair of substantially identical tower sections having at least three vertical legs, the sections being in end-to-end relationship, one atop the other, each section having near the end thereof facing the other section a web-like brace extending between and connecting its legs; bayonet connectors at the facing ends of the legs of the sections, the connectors of one section being adapted to interlock with those of the other to connect the sections; and a plurality of support means between the braces, there being one support means near each leg, said support means operating between the braces and being adapted to support the uppermost section with its connectors next to the connectors of the lower section, said support means being inoperative when the sections are connected.

7. In a tower crane the combination comprising: a tower formed of a plurality of tower sections, each section comprising at least three vertical legs and a pair of web-like braces extending between the legs near opposite ends of the section, the braces of one section facing those of adjacent sections, the legs of the sections being in aligned end-to-end relationship; bayonet-type connectors at the ends of the legs the facing connectors of any two sections being interlocked to provide a twist connection between the sections; a revolvable frame movable along and revolvable about the tower; a plurality of channel shaped inwardly opening shoes, one for each leg, mounted on and revolvable with the frame, the shoes being adapted to slidably receive associated legs of an additional section to be added and to twistingly engage the legs to cause connection of the additional section to the tower in response to revolution of the frame; and a plurality of support means, one for each leg, formed on the outer surfaces of the braces of the sections, the support means of any two adjacent sections being adapted to engage one another to support the uppermost of the two sections with its connectors next to and in alignment with the connectors of the lower section immediately prior to the uppermost section being twisted into place, each of said support means being inclined so that the support means are not in engagement when the sections have been connected.

8. In a tower crane the combination comprising: a tower formed of a plurality of sections each having at least three vertical legs, with the legs of the sections being in aligned end-to-end relationship; a revolvable frame mounted on, movable along, and revolvable about the tower; jaw means mounted on and revolvable with the revolvable frame and adapted to engage the tower sections to disconnect the same from one another; and bayonet-type connectors affixed to the ends of the legs of the sections, each connector having a bayonet slot and a bayonet projection overhanging the slot, the facing connectors of the legs of adjacent tower sections being interlocked with the bayonet projections of one being received in the bayonet slot of the other, the interlocked connectors serving as twist connections between the tower sections.

9. In a tower crane the combination comprising: a tower formed of a plurality of sections of equilateral triangular cross section with three vertical legs, the legs of the sections being in aligned end-to-end relationship; a revolvable frame movable along and revolvable about the tower; jaw means mounted on and revolvable with the frame adapted to engage the legs of the sections to disconnect the same from one another; and bayonet-type connectors affixed to the ends of the legs of the sections, each connector having a bayonet slot at its midline with a floor that extends to the front of the connector, and a bayonet projection at its midline that overhangs the slot, the undersurface of the projection being the roof of the slot, the upper surface of the projection extending to the rear of the connector, the facing connectors of the legs of two adjacent tower sections being interlocked with the bayonet projection of one received in the bayonet slot of the other, the slot floor and upper surface of the projection of one facing the upper surface of the projection and slot floor of the other, respectively, and with the projection undersurfaces facing one another.

10. A tower crane according to claim 9 wherein the undersurface of the bayonet projection is inclined upwardly from the rear to the front of each connector to provide a wedging action between two interlocked connectors, the upper surface of the projection is cut away to the rear of the midline of each connector so that the upper surfaces and floors of interlocked connectors engage along areas running across and at the midlines of the connectors, and each connector is set at an obtuse angle to a radius drawn from the center of the tower.

11. In a tower crane the combination comprising: a tower formed of a plurality of tower sections, each section comprising at least three vertical legs and a pair of web-like braces extending between the legs near opposite ends of the section, the braces of any one section facing those of adjacent sections, the legs of the sections being in aligned end-to-end relationship; bayonet-type connectors at the ends of the legs the facing connectors of two sections being interlocked to provide a twist connection between the sections; a support structure mounted on and movable along the tower, said structure being adapted to be latched in a working position near the top of the tower; a revolvable frame mounted by and movable with the support member and revolvable about the tower; a plurality of channel shaped inwardly opening shoes, one for each leg, mounted on and revolvable with the frame, the shoes being adapted to slidably receive associated legs of an additional section to be added to the tower and to be twistingly engageable with the legs to cause the additional section to be twisted into a connection with the tower in response to revolution of the frame, the shoes being above the tower when the support structure is in working position; a plurality of support means, one for each leg, formed on the outer surfaces of the braces of the tower sections, the support means of any two adjacent sections being adapted to supportingly engage one another to support the uppermost of the two sections with its connectors next to and in alignment with the connectors of the lower section immediately prior to the uppermost section being twisted into place, said support means being inclined so that they are not in engagement when the sections have been connected; openings in the braces of the sections that extend through the support means and are in vertical alignment when the sections are connected together; and pin means adapted to pass through the openings to lock the sections in connected relationship.

References Cited by the Examiner

UNITED STATES PATENTS

| 2,967,069 | 1/1961 | Holmes. |
| 3,168,336 | 2/1965 | Lowrence _____ 212—144 X |

FOREIGN PATENTS

| 1,243,896 | 9/1960 | France. |
| 599,409 | 11/1959 | Italy. |
| 610,712 | 10/1960 | Italy. |

SAMUEL F. COLEMAN, *Primary Examiner.*

A. LEVINE, *Assistant Examiner.*